US012487961B2

(12) United States Patent
Madathikandam et al.

(10) Patent No.: US 12,487,961 B2
(45) Date of Patent: Dec. 2, 2025

(54) SCALABLE AND MODULAR BUS CONTROLLER INCLUDING PAGE MEMORY PLD ARCHITECTURE

(71) Applicant: Hamilton Sundstrand Corporation, Charlotte, NC (US)

(72) Inventors: Rajesh Madathikandam, Karnataka (IN); Robin David Hill, Solihull (GB); Ashish Vijay, Rajasthan (IN); Stephen Potter, Nuneaton (GB); Rajeeva Krishna, Bangalore (IN); Anitha Thangavel, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 52 days.

(21) Appl. No.: 18/492,222

(22) Filed: Oct. 23, 2023

(65) Prior Publication Data

US 2024/0345984 A1 Oct. 17, 2024

(30) Foreign Application Priority Data

Apr. 12, 2023 (IN) .............................. 202311027148

(51) Int. Cl.
*G06F 13/42* (2006.01)
*G06F 13/362* (2006.01)
*G06F 13/38* (2006.01)

(52) U.S. Cl.
CPC ........ *G06F 13/4243* (2013.01); *G06F 13/362* (2013.01); *G06F 13/382* (2013.01)

(58) Field of Classification Search
CPC .. G06F 13/4243; G06F 13/362; G06F 13/368; G06F 13/382; G06F 13/384; G06F 13/385; G06F 13/38
See application file for complete search history.

(56) References Cited

U.S. PATENT DOCUMENTS

| 4,228,496 A | 10/1980 | Katzman et al. |
|---|---|---|
| 4,535,453 A | 8/1985 | Rhodes et al. |

(Continued)

FOREIGN PATENT DOCUMENTS

| GB | 2256293 A | 12/1992 | |
|---|---|---|---|
| WO | WO-2006112968 A1 * | 10/2006 | ......... G06F 13/1684 |

OTHER PUBLICATIONS

European Search Report for Application No. 24168323.4, mailed Sep. 24, 2024, 11 pages.

*Primary Examiner* — Raymond N Phan
(74) *Attorney, Agent, or Firm* — CANTOR COLBURN LLP

(57) ABSTRACT

A bus controller-based page memory programmable logic device (PLD) architecture includes a plurality of PLD modules and a bus controller in signal communication with the plurality of PLD modules via a universal bus interface. Each PLD module include a PLD memory unit configured to store first data. The bus controller includes bus memory unit configured to store second data and includes a bus controller engine configured to sequentially execute a set of bus controller instructions. One or both of the first data and the second data is transferred between the bus controller and a target PLD module among the plurality of PLD modules in response to sequentially executing the set of bus controller instructions.

14 Claims, 3 Drawing Sheets

(56) References Cited

U.S. PATENT DOCUMENTS

| | | | |
|---|---|---|---|
| 5,535,342 A * | 7/1996 | Taylor | G06F 30/34 |
| | | | 710/11 |
| 6,614,259 B2 * | 9/2003 | Couts-Martin | H03K 19/17704 |
| | | | 326/46 |
| 6,748,456 B1 * | 6/2004 | Stanton | H03K 19/17748 |
| | | | 711/170 |
| 7,334,159 B1 | 2/2008 | Callaghan | |
| 7,568,085 B2 | 7/2009 | Ramesh | |
| 7,596,671 B2 | 9/2009 | Frank et al. | |
| 8,384,427 B1 | 2/2013 | Tang et al. | |
| 8,521,934 B1 | 8/2013 | Ni | |
| 9,064,560 B2 | 6/2015 | Qawami et al. | |
| 11,049,532 B2 * | 6/2021 | Best | G11C 7/1066 |
| 11,243,886 B2 | 2/2022 | Lee et al. | |
| 2003/0160633 A1 * | 8/2003 | Terrill | G06F 11/1417 |
| | | | 326/39 |
| 2011/0068823 A1 | 3/2011 | German et al. | |
| 2016/0350002 A1 | 12/2016 | Vergis et al. | |

\* cited by examiner

SCALABLE AND MODULAR BUS CONTROLLER INCLUDING PAGE MEMORY PLD ARCHITECTURE

CROSS-REFERENCE TO RELATED APPLICATIONS

This application claims the benefit of Indian patent application No. 202311027148 filed Apr. 12, 2023, the disclosure of which is incorporated herein by reference in its entirety.

BACKGROUND

The present disclosure relates to electrical systems and, in particular, to an electrical system having programmable logic devices (PLDs) with a non-standard bus controller-based PLD architecture.

A bus controller-based PLD device can have a bus as well as programmable logic device (PLD) modules attached to the bus and a bus controller. The bus controller may have bus control logic, interface logic, input multiplexing logic and memory pages. Together, these functionalities of PLD modules and the functionality of the PLD device features of the bus controller allow for management of multiple functionalities of the PLD modules.

SUMMARY

According to a non-limiting embodiment of the disclosure, a scalable and modular bus controller-based programmable logic device (PLD) page memory architecture. The scalable and modular bus controller-based programmable logic device (PLD) page memory architecture comprises a bus controller-based page memory programmable logic device (PLD) architecture includes a plurality of PLD modules and a bus controller in signal communication with the plurality of PLD modules via a universal bus interface. Each PLD module include a PLD memory unit configured to store first data. The bus controller includes bus memory unit configured to store second data and includes a bus controller engine configured to sequentially execute a set of bus controller instructions. One or both of the first data and the second data is transferred between the bus controller and a target PLD module among the plurality of PLD modules in response to sequentially executing the set of bus controller instructions.

In accordance with additional or alternative embodiments, the universal bus interface comprises a controller output interface that delivers first data signals from the bus controller to the PLD modules; and a controller input interface that delivers second data signals from the plurality of PLD modules to the bus controller.

In accordance with additional or alternative embodiments, the bus controller sequentially executes the set of bus controller instruction periodically after execution of all the instructions of the bus sequence or in response to receiving an event signal from a given PLD.

In accordance with additional or alternative embodiments, the bus controller inputs a clock signal, and sequentially executes the set of bus controller instructions based on the clock signal.

In accordance with additional or alternative embodiments, sequentially executing the set of bus controller instructions includes sequentially processing one instruction included in the set of bus controller instructions per clock cycle.

In accordance with additional or alternative embodiments, a number of the plurality of PLD modules can be changed.

In accordance with additional or alternative embodiments, the event includes at least one of executing all instructions of a bus sequence, and in response to receiving an event signal from a given PLD following completion of an operation performed by the given PLD.

According to a non-limiting embodiment, a method to operate a scalable and modular bus controller-based programmable logic device (PLD) page memory architecture is provided. The method comprises storing first data in a PLD memory unit of a PLD module included among a plurality of PLD modules, and storing second data in bus memory unit of a bus controller that is in signal communication with the plurality of PLD modules via a universal bus interface. The method further comprises sequentially executing, by the bus controller, a set of bus controller instructions stored in the bus memory unit, and exchanging data signals between the bus controller and the plurality of PLD modules via the universal bus interface. Exchanging the data signals includes transferring one or both of the first data and the second data between the bus controller and a target PLD module among the plurality of PLD modules in response to sequentially executing the set of bus controller instructions.

In accordance with additional or alternative embodiments, the universal bus interface comprises a controller output interface that delivers first data signals from the bus controller to the PLD modules; and a controller input interface that delivers second data signals from the plurality of PLD modules to the bus controller.

In accordance with additional or alternative embodiments, the bus controller sequentially executes the set of bus controller instruction periodically after execution of all the instructions of the bus sequence or in response to receiving an event signal from a given PLD.

In accordance with additional or alternative embodiments, the bus controller inputs a clock signal, and sequentially executes the set of bus controller instructions based on the clock signal.

In accordance with additional or alternative embodiments, sequentially executing the set of bus controller instructions includes sequentially processing one instruction included in the set of bus controller instructions per clock cycle.

In accordance with additional or alternative embodiments, a number of the plurality of PLD modules can be changed.

In accordance with additional or alternative embodiments, the event includes at least one of executing all instructions of a bus sequence, and in response to receiving an event signal from a given PLD following completion of an operation performed by the given PLD.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
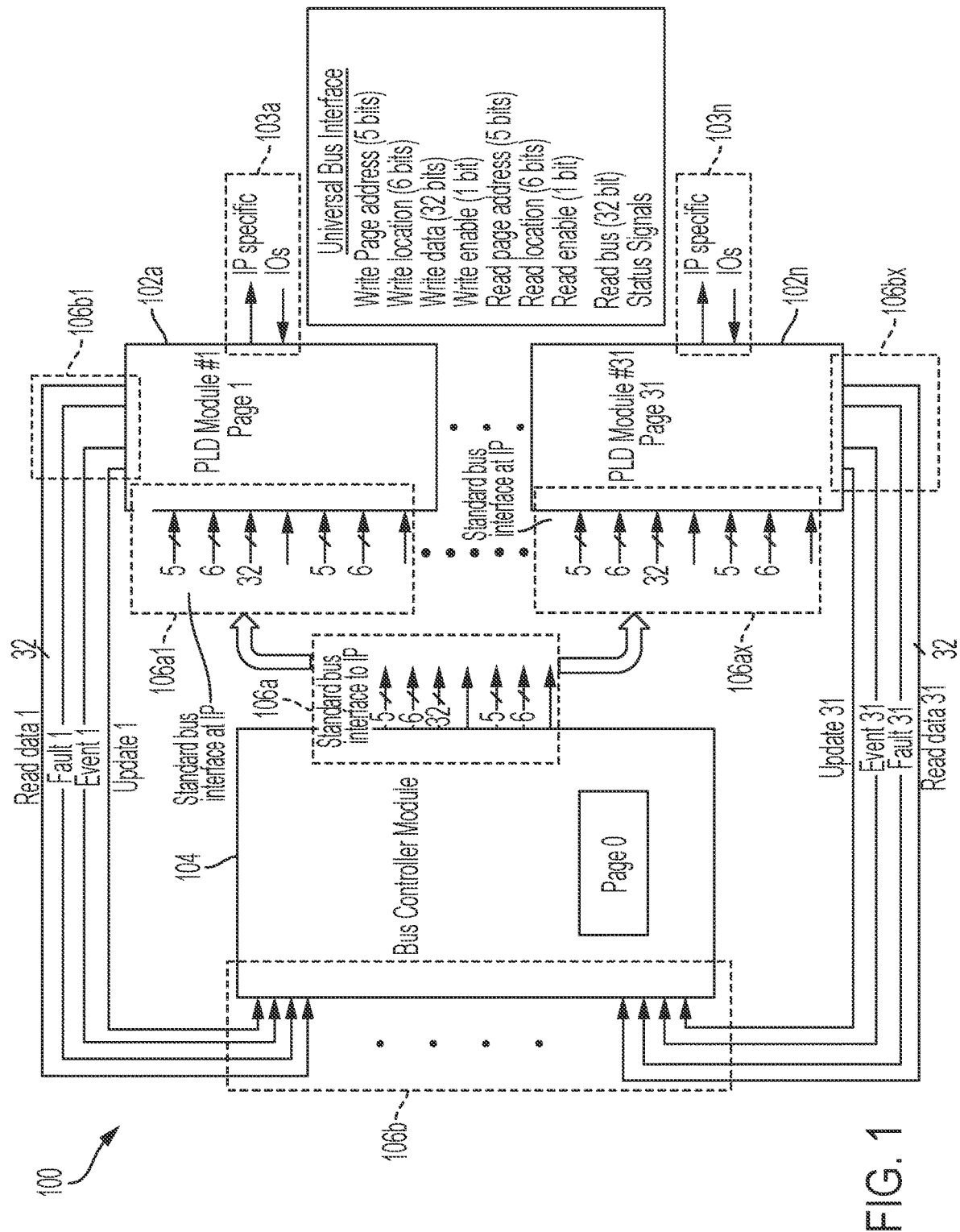
FIG. 1 is a s block diagram illustrating a bus controller-based paged memory architecture according to a non-limiting embodiment of the present disclosure.

Programmable Logic Devices (PLDs) are typically designed to contain a set of functional blocks can be termed as PLD building blocks, which are interconnected to each other based on the data and control flow requirements. The type of interconnections between these building blocks could be unique between any two functions, and some PLD functions may have incoming and outgoing data and control flow to every other function. This design complicates the development and maintenance of these building blocks. Even if these building blocks are made as re-usable IP libraries, it may be necessary to creating minor or major variants of these building blocks for different applications. The need to change or modify these building blocks on application basis restricts the plug and play, "modularity", and re-use of these building blocks in a PLD architecture, and in turn impacts the cost and schedule of the PLD designs.

Various non-limiting embodiments of the present disclosure provide a modular, scalable and reusable PLD architecture to address drawbacks found in conventional PLD design approaches, while also allowing for reusable PLD building blocks in different types of applications. For example, one or more non-limiting embodiments provides a bus controller-based page memory PLD architecture 100 that establishes a universal, which facilitates aspects of scalability (e.g., actively increasing or decreasing the number of PLD modules), modularity, (e.g., actively replacing one or more of the PLD modules with another PLD module that supports a different application); and re-usability (e.g., use of the same PLD module in one or multiple systems, one time or multiple times)

In one or more non-limiting embodiments of the disclosure, a bus controller-based paged memory architecture provides the following: (1) a bus controller-based paged memory architecture which allows every PLD module to be developed as a PLD building block capable of exchanging data with a bus controller via a universal bus interface; (2) executes a set sequence of a bus controller instructions (also referred to as "command sequence execution") to control the operation of the bus controller instead of complicated and costly software decision logic; (3) any configuration, control, status, input or output data that a function needs can be provided via the memory mapped control registers, and any data consumed or produced by a function is read from and written to page memory locations; (4) allows for conveniently configuring the bus controller sequence to facilitate plug-and-play re-use of the PLD modules; (5) capability to dynamically configure the PLD modules through the bus controller; (6) to control the rate of execution of bus controller sequence which in turn supports the timing and scheduling configurability suited to any application; (7) custom modules operating with the universal bus interface enables flexible use of IP(s) for various applications without any changes; (8) provides modularity to enable the development PLD modules that are operable with a universal bus interface to perform different applications; (9) provides scalability so that a bus controller (e.g., a single bus controller) can support a plurality of unique PLD modules (e.g., 31 PLD modules) or multiple instantiations of the same PLD module; and (10) implements a universal bus interface to facilitate re-usability of one or more PLD modules across multiple different applications.

In one or more non-limiting embodiments, a scalable and modular bus controller-based page memory architecture includes a universal (e.g., common) interface configured to facilitate signal communication and data exchange such as status communications, for example, between the bus controller and all PLD modules (e.g., PLD building blocks) in the PLD designed system. According to a non-limiting embodiment, the bus controller can be implemented as a hardware controller that is programmed with a limited set of instructions (commands), which enables the data movement across functional PLD modules according to a target timing reference. The bus controller can also communicate with a set number of PLD modules (e.g., 31 PLD modules), and includes a sequence engine. The sequence engine (also known as a sequence decoder) can process one operation from a set number of operations per clock cycle to facilitate command sequence execution data and transfer data between controller memory locations and any of the pages (i.e., the PLD modules) in the paged memory architecture.

With reference now to FIG. 1, a bus controller-based page memory PLD architecture 100 (herein referred to as a "bus controller-based architecture") is illustrated according to a non-limiting embodiment of the present disclosure. The bus controller-based architecture 100 includes a plurality of PLD modules 102a-102n, and a bus controller 104. Each of the PLD modules 102a-102n provides a memory page.

The bus controller 102 provides a universal (e.g. common) bus interface 106a and 106b, which facilitates data exchange (also referred to as data transfer) between the bus controller 104 and each of PLD module 102a-102n included in the bus controller-based page memory PLD architecture 100. The universal bus interface 106a and 106b can include a bus controller output interface 106a that delivers signals and commands to the PLD modules 102a-102n and a bus controller input interface 106b that receives signals and commands from the PLD modules 102a-102n. Accordingly, the bus controller-based architecture 100 facilitates scalability and modularity compared to conventional PLD architectures. In addition, the universal bus interface allow for re-using one or more of the PLD modules 102a-102n across a variety of different PLD applications including, but not limited to, Primary flight control systems, secondary flight control systems, break control systems.

Figure 2:
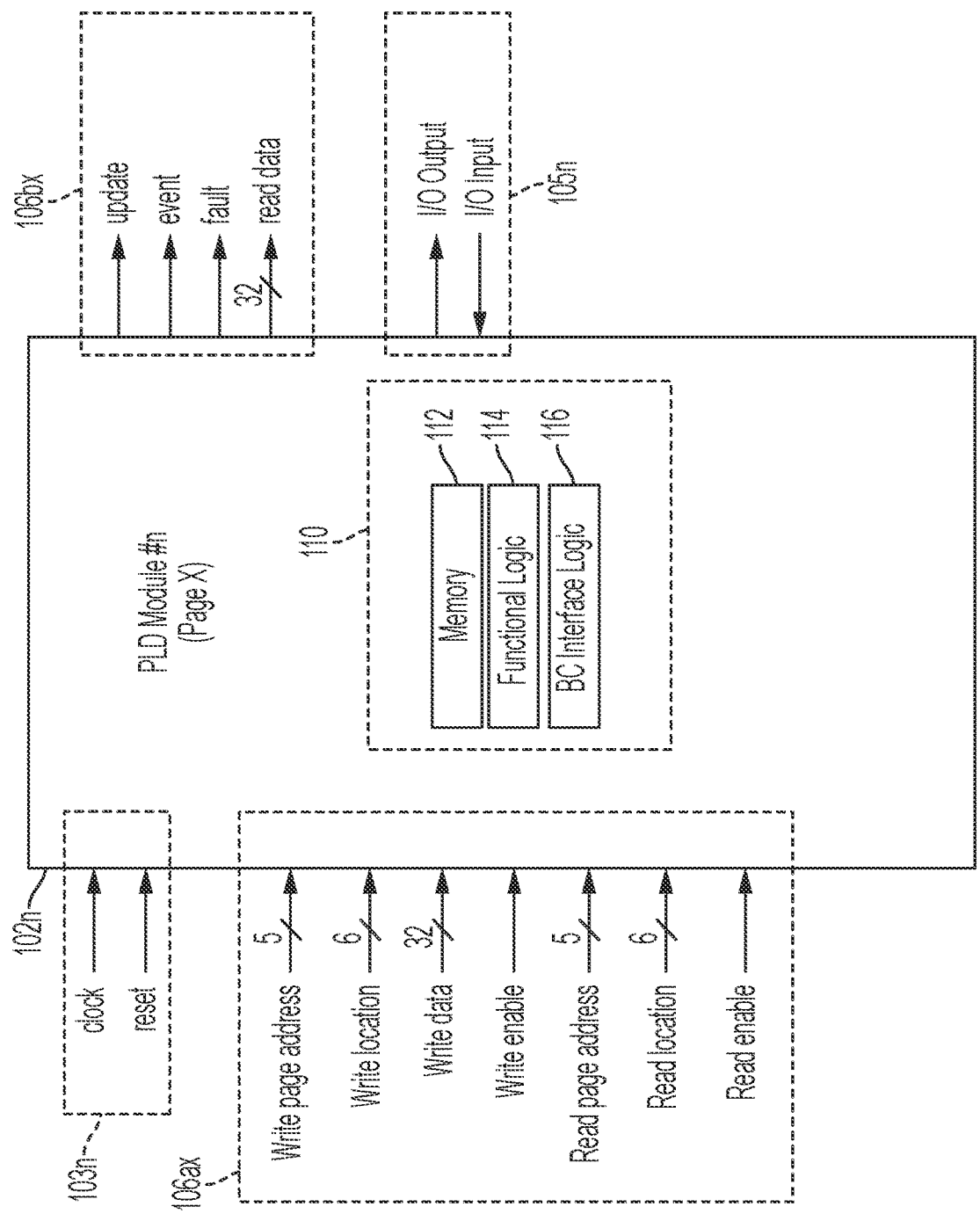
FIG. 2 is a block diagram illustrating a PLD module included in the bus controller-based paged memory architecture illustrated in FIG. 1 according to a non-limiting embodiment of the present disclosure.

Turning to FIG. 2, a PLD module 102n included in the bus controller-based page memory PLD architecture 100 shown in FIG. 1 is illustrated in greater detail. The PLD module 102n receives input signals and input commands from the bus controller 104 via the controller output interface 106ax, and delivers output signals and output commands to the bust controller 104 via the controller input interface 106bx, where "x" identifies the corresponding PLD module 102a-102n included bus controller-based page memory PLD architecture 100. Accordingly, the PLD module 102n can serve as an individual memory page (X), which data can be written to via the controller output interface 106ax and data can be read from via the controller input interface 106bx.

The input signals and input commands received from the controller output interface 106ax include: a Write page address signal; a Write location signal; a Write data signal;

a Write enable signal; a Read page address signal; a Read location signal; and a Read enable signal. The functions of these signals are described in greater detail below.

The output signals and output commands delivered to the bus controller input interface 106bx include: an update signal; an event signal; a fault signal; and a read data signal. The update signal can provide a status of the PLD module 102n. The status update can include, for example, a change (added data, removed data, data write to particular memory locations, etc.) associated with an address location of the PLD module 102n. The event signal can indicate a current event associated with the PLD module 102n. For example, the event signal can acknowledge initiation of a read/write operation and/or a completion of a read/write operation and completion of some functional operation. The fault signal can be output from the PLD module 102n in response experiencing a page fault. A page fault can include, for example, a corrupt address location, the health of the PLD module 102n, or another fault occurrence associated with the PLD module 102n. The read data signal includes the data read out from the PLD module 102n (e.g., data read out from memory unit 112).

According to a non-limiting embodiment, the PLD module 102n also includes a PLD control interface 103n and an input/output (I/O) interface 105n. The PLD control interface 103n is configured to input a PLD clock signal ("clock") and a reset signal ("reset"). The input PLD clock signal is a timing pulse to control the operation of the PLD logic elements and samples the input and output signals. The input reset signal resets the PLD logic elements and outputs to predefined states. The I/O interface 105n is configured to input an I/O data signal ("I/O Input"), e.g., from one or more I/O devices connected to the PLD module 102n, and to output an I/O data signal ("I/O Output"), e.g., to one or more I/O devices connected to the PLD module 102n. According to a non-limiting embodiment, the input I/O data signal and the output I/O data signal are I/O data signals that are specific to a particular application of the PLD module 102n and/or the particular I/O devices connected to the PLD module 102n. One or more PLD modules 102n can operate according to the I/O specific application and specific type of I/O device, or can operate according to different I/O specific applications and specific type of I/O devices.

The PLD module 102n further includes a PLD engine 110, which supports a memory unit 112, functional logic 114, and bus controller interface logic 116. The memory unit 112 includes a plurality of individual memory locations. Each memory location is assigned a unique address and is configured to store data (e.g., 32 bits) based on the write commands received via the controller output interface 106ax, and to read out stored data via the controller input interface 106bx. The functional logic 114 can perform various functional operations on data stored in the memory unit 112 such as, for example, various arithmetic and/or computational operations associated with the PLD application and/or I/O device type, data encoding/decoding, etc. The bus control interface logic 116 provides the PLD module 102n information pertaining to the controller output interface 106ax and the controller input interface 106bx, including interface input and/or output addresses, read/write timing parameters, etc. In one or more non-limiting embodiments, the bus control logic 116 enables the data write and read to the memory 112 of the PLD module 102n by the bus controller 104 using the information pertaining to the bus controller output interface 106ax and the bus controller input interface 106bx, including the interface input and/or output address, location, read/write timing parameters, etc.

Figure 3:
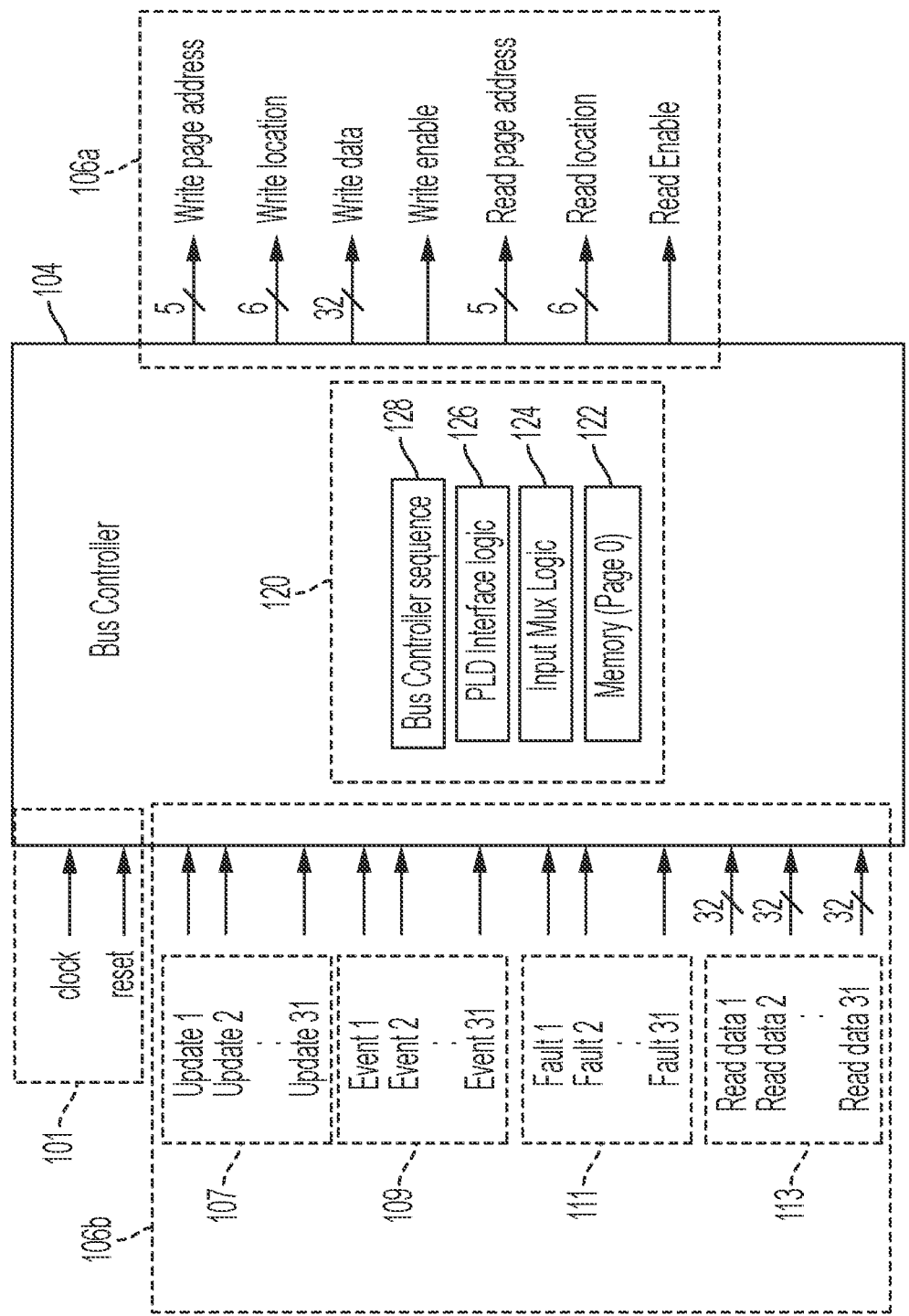
FIG. 3 is a block diagram illustrating a bus controller including a universal bus interface configured to exchange data with a plurality of PLD modules included in the bus controller-based paged memory architecture illustrated in FIG. 1 according to a non-limiting embodiment of the present disclosure.

Referring to FIG. 3, the bus controller 104 included in the bus controller-based page memory PLD architecture 100 shown in FIG. 1 is illustrated in greater detail. According to a non-limiting embodiment, the bus controller 104 operates according to a set of sequence of instructions rather than performing logical decisions based on different types of input data to determine which actions to take. The sequence of instructions effectively instructs the bus controller 104 to the location at which to read data (e.g., from which PLD module 102a-102n to obtain data) and to the location at which to write data (e.g., which PLD module 102a-102n to store the data).

As described herein, the bus controller 104 establishes a universal bus interface, which includes a controller output interface 106a and a controller input interface 106b. The controller output interface 106a is configured to output a variety of signals including: a Write page address signal; a Write enable signal; a Write location signal; a Write data signal; a Read enable signal; a Read page address signal; and a Read location signal.

The Write page address signal includes data (e.g., 5 bits) identifying the page address of a target PLD module 102n at which to write data. Accordingly, a given PLD module 102n can receive the Write page address signal and compare the address included in the signal to its assigned page address to determine whether the bus controller 104 is communicating with the correct or intended PLD module 102n. When the address in the signal does not match the address assigned to the PLD module 102n, the PLD module 102n can output a Fault signal to the bus controller 104.

In one or more non-limiting embodiments, the bus controller 104 outputs the Write enable signal informing the PLD module 102n of an intended write operation. Accordingly, the bus controller 104 outputs the Write location signal, which includes data (e.g., 6 bits) identifying the address location in the target PLD module 102n at which to write data, and the Write data which includes the data (e.g., 32 bits) to be written to the target PLD module 102n (e.g., into the memory unit) at the address location indicated by the Write location signal.

Likewise, the Read page address signal includes data (e.g., 5 bits) identifying the page address of a target PLD module 102n from which to read data. Accordingly, a given PLD module 102n can receive the Read page address signal and compare the address included in the signal to its assigned page address to determine whether the bus controller 104 is communicating with the correct or intended PLD module 102n.

Assuming the target PLD module 102n is present, the bus controller 104 outputs the Read enable signal informing the PLD module 102n of an intended read operation. The bus controller 104 can then output the Read location signal, which includes data (e.g., 6 bits) representing an address of a memory location in the target PLD module 102n from which to read data. Based on the Read location signal, the target PLD module 102n reads out the data stored in the corresponding memory location, and outputs the data onto the controller input interface 106b.

With continued reference to FIG. 3, the controller input interface 106b allows for inputting the PLD output signals from each of the PLD modules 102a-102n included in the bus controller-based page memory PLD architecture 100. For example, the controller input interface 106b facilitates input of the following signals from each of the PLD modules 102a-102n: the Update signals 107 (e.g., 1-31); the Event signals 109 (e.g., 1-31); the Fault signals 111 (e.g., 1-31); and the Read Data signals 113 (e.g., 1-31) providing the data that is readout from a respective PLD module 102a-102n. Accordingly, the universal bus interface 106a and 106b can support a plurality of destination nodes (e.g., a plurality of PLD modules 102a-102n) to a single receiver node (e.g., a single bus controller 104).

The bus controller module 104 operates according to a bus controller interface 101 and a bus controller engine 120. The bus controller interface 101 is configured to input a clock signal ("clock") and a reset signal ("reset"). In one or more non-limiting embodiments, the clock signal is a digital signal which oscillates between a high state and a low state at a constant frequency, and the bus controller 104 sequentially processes instructions or operations (i.e., performs a command sequence execution) based on the oscillating high and low states of the clock signal.

The bus controller engine 120 includes a memory unit 122, input multiplexing (MUX) logic 124, PLD module interface logic 126, and bus controller sequence 128. The memory unit 122 is configured to store read data 113 receiving via the controller input interface 106b. The input MUX logic 124 facilitates the ability of the bus controller 104 to select a target signal for input among the different signals received from the controller input interface 106b, e.g., Update signals 107 (e.g., 1-31); the Event signals 109 (e.g., 1-31); the Fault signals 111 (e.g., 1-31); and the Read Data signals 113. The PLD module interface logic 126 provides the bus controller 104 with information pertaining to the controller output interface 106a and the controller input interface 106b, including interface input and/or output addresses, read/write timing parameters, etc. The bus controller sequence 128 includes a set bus controller instruction sequence, which controls operation of the bus controller 104 according to a set sequence of instructions. In this manner, the bus controller engine can operate as a sequence engine. In one or more non-limiting embodiments, sequential processing of the instructions (e.g., starting with instruction number 1 and ending with instruction n) can be initiated in response to receiving an Event signal via the controller input interface 106b.

According to a non-limiting embodiment, the bus controller 104 sequentially processes one operation or instruction included in the bus controller sequence 128 per clock cycle. Rather than performing data exchange between the memory locations of any of the page, e.g., any PLD module 102a-102n using logic software, decision making or branching operations, the bus controller 104 executes in sequence a set number of instructions or transfer operations (e.g., instructions 1 through n) included in the bus controller sequence 128. In this manner, reserved values in the command space of the controller sequence 128 allows for the option to include additional commands in the future. An example of a set number commands used to establish a bus controller sequence 128 is depicted in the table below.

| Inst. # | Parity | Unused | Command | Source | Destination |
|---|---|---|---|---|---|
| 1 | <1 bit> | <5 bits> | <4 bits> | <11 bits> | <11 bits> |
| 2 | Odd | <zeros> | NOP | <unused> | <unused> |
| 3 | Odd | <zeros> | COPY | Page, Location | Page, Location |
| 4 | Odd | <zeros> | COPY_NEW | Page, Location | Page, Location |
| 5 | Odd | <zeros> | LOOP | <unused> | <unused> |
| 6 | Odd | <zeros> | DATA | <22 least significant bits> | |
| 7 | Odd | <zeros> | DATA_WRITE | <10 bits> | Page, Location |

-continued

| Inst. # | Parity | Unused | Command | Source | Destination |
|---|---|---|---|---|---|
| 8 | Odd | <zeros> | WAIT | <unused> | 5 bits clock count |
| 9 | Odd | <zeros> | WAIT_UNTIL | Timeout | Event |

Technical effects and benefits of the present disclosure are the provision of a bus controller-based page memory PLD architecture that can be developed without modification with bus controllers to support more than a certain number of PLD modules (e.g., up to or more than 31 PLD modules), while also providing aspects of scalability (e.g., actively increasing or decreasing the number of PLD modules), modularity, (e.g., actively replacing one or more of the PLD modules with another PLD module that supports a different application); and re-usability (e.g., use of the same PLD module in one or multiple systems, one time or multiple times).

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A bus controller-based page memory programmable logic device (PLD) architecture comprising:
a plurality of PLD modules, each PLD module including a PLD memory unit configured to store first data, the plurality of PLD modules including a bus controller in signal communication with the plurality of PLD modules via a universal bus interface, the bus controller comprising:
a controller input interface including a plurality of inputs configured to establish a multiplex connection between the bus controller and each of the PLD modules;
bus memory unit configured to store second data; and
a bus controller engine configured to sequentially execute a set of bus controller instructions, the bus controller engine including input multiplexing (MUX) logic to select data from the plurality of input to control data flow over the multiplex connection, wherein one or both of the first data and the second data is transferred between the bus controller and a target PLD module among the plurality of PLD modules in response to sequentially executing the set of bus controller instructions.

2. The bus controller-based page memory PLD architecture of claim 1, wherein the universal bus interface comprises:
a controller output interface,
wherein the controller output interface delivers the first data signals from the bus controller to the PLD modules; and
wherein the controller input interface delivers second data signals from the plurality of PLD modules to the bus controller.

3. The bus controller-based page memory PLD architecture of claim 2, wherein the bus controller sequentially executes the set of bus controller instruction periodically after execution of all the instructions of the bus sequence or in response to receiving an event signal from a given PLD.

4. The bus controller-based page memory PLD architecture of claim 3, wherein the bus controller inputs a clock signal, and sequentially executes the set of bus controller instructions based on the clock signal.

5. The bus controller-based page memory PLD architecture of claim 3, wherein the event includes at least one of executing all instructions of a bus sequence, and in response to receiving an event signal from a given PLD following completion of an operation performed by the given PLD.

6. The bus controller-based page memory PLD architecture of claim 4, wherein sequentially executing the set of bus controller instructions includes sequentially processing one instruction included in the set of bus controller instructions per clock cycle.

7. The bus controller-based page memory PLD architecture of claim 6, wherein a number of the plurality of PLD modules can be changed.

8. A method to operate a scalable and modular bus controller-based programmable logic device (PLD) page memory architecture comprises:
storing first data in a PLD memory unit of a PLD module included among a plurality of PLD modules;
storing second data in bus memory unit of a bus controller that is in signal communication with the plurality of PLD modules via a universal bus interface that establishes a multiplex connection between the bus controller and the plurality of PLD modules;
sequentially executing, by the bus controller, a set of bus controller instructions stored in the bus memory unit; and
exchanging data signals between the bus controller and the plurality of PLD modules via the universal bus interface, wherein exchanging the data signals includes:
transferring one or both of the first data and the second data between the bus controller and a target PLD module among the plurality of PLD modules in response to sequentially executing the set of bus controller instructions.

9. The method of claim 8, wherein exchanging the data signals further includes:
delivering, via a controller output interface of the universal bus interface, first data signals from the bus controller to the PLD modules; and
delivering, via a controller input interface of the universal bus interface, second data signals from the plurality of PLD modules to the bus controller.

10. The method of claim 9, further comprising sequentially executing the set of bus controller instruction periodically after execution of all the instructions of the bus sequence or in response to receiving an event signal from a given PLD.

11. The method of claim 10, further comprising:
inputting a clock signal to the bus controller inputs a clock signal; and
sequentially executing the set of bus controller instructions based on the clock signal.

12. The method of claim 10, wherein the event includes at least one of executing all instructions of a bus sequence, and in response to receiving an event signal from a given PLD following completion of an operation performed by the given PLD.

13. The method of claim 11, wherein sequentially executing the set of bus controller instructions includes sequentially processing one instruction included in the set of bus controller instructions per clock cycle.

14. The method of claim 13, wherein a number of the plurality of PLD modules can be changed.

\* \* \* \* \*